United States Patent [19]
Kitani

[11] Patent Number: 5,216,647
[45] Date of Patent: Jun. 1, 1993

[54] TARGET TRACK POSITION RETRIEVAL DEVICE

[75] Inventor: Satoshi Kitani, Tokyo, Japan

[73] Assignee: Sony Corporation, Tokyo, Japan

[21] Appl. No.: 629,449

[22] Filed: Dec. 18, 1990

[30] Foreign Application Priority Data

Dec. 28, 1989 [JP] Japan .................. 1-341829

[51] Int. Cl.$^5$ .............................. G11B 7/00
[52] U.S. Cl. .................. 369/44.28; 369/32; 369/43; 369/47; 369/50; 360/78.06
[58] Field of Search .................. 369/32, 44.28, 47, 48, 369/50, 51, 52, 54, 100, 111, 44.11, 33, 43, 44.34, ; 360/77.03, 77.06, 78.04, 78.06, 77.01, 77.02, 77.03; 358/335, 342, 907

[56] References Cited

U.S. PATENT DOCUMENTS

| | | | |
|---|---|---|---|
| 4,751,693 | 6/1988 | Yoshimaru | 369/32 |
| 4,825,431 | 4/1989 | Kimura et al. | 369/50 |
| 4,873,679 | 10/1989 | Murai et al. | 369/32 |
| 5,012,461 | 4/1991 | Yoshida et al. | 369/32 |

*Primary Examiner*—Roy N. Envall, Jr.
*Assistant Examiner*—Hung Dang
*Attorney, Agent, or Firm*—Alvin Sinderbrand; William S. Frommer

[57] ABSTRACT

This invention is directed to a target track retrieval device comprising a signal playback apparatus for playing back signals from information tracks recorded on a rotary disc rotatably driven at constant linear velocity, a movement circuit for moving the playback apparatus in a direction traversing the information tracks, a counter responsive to the signals from the playback apparatus to count the number of information tracks traversed by the playback apparatus, and a control circuit for comparing target position information indicating a target track position and a count value of the counter to stop movement of the playback apparatus when the target position information and the count value are in correspondence with each other. The number of tracks [M] from a present track position to the target track is determined as a function of the number of tracks [n] to be traversed by the playback apparatus during a playback time $[t_n]$ from a reference track to the target track, in accordance with:

$$t_n = \frac{2\pi}{v_0} \sum_{i=1}^{n} (r_0 + i \cdot p)$$

where $[v_0]$ is the linear velocity, $[p]$ is the track pitch and $[r_0]$ is the radius of the reference track; and the rotational velocity of the rotary disc when the target track is reached is controlled by velocity information $[\Delta t_n]$ which represents the time required for one rotation of the target track wherein:

$$\Delta t_n = \frac{2\pi}{v_0} (r_0 + n \cdot p).$$

9 Claims, 3 Drawing Sheets

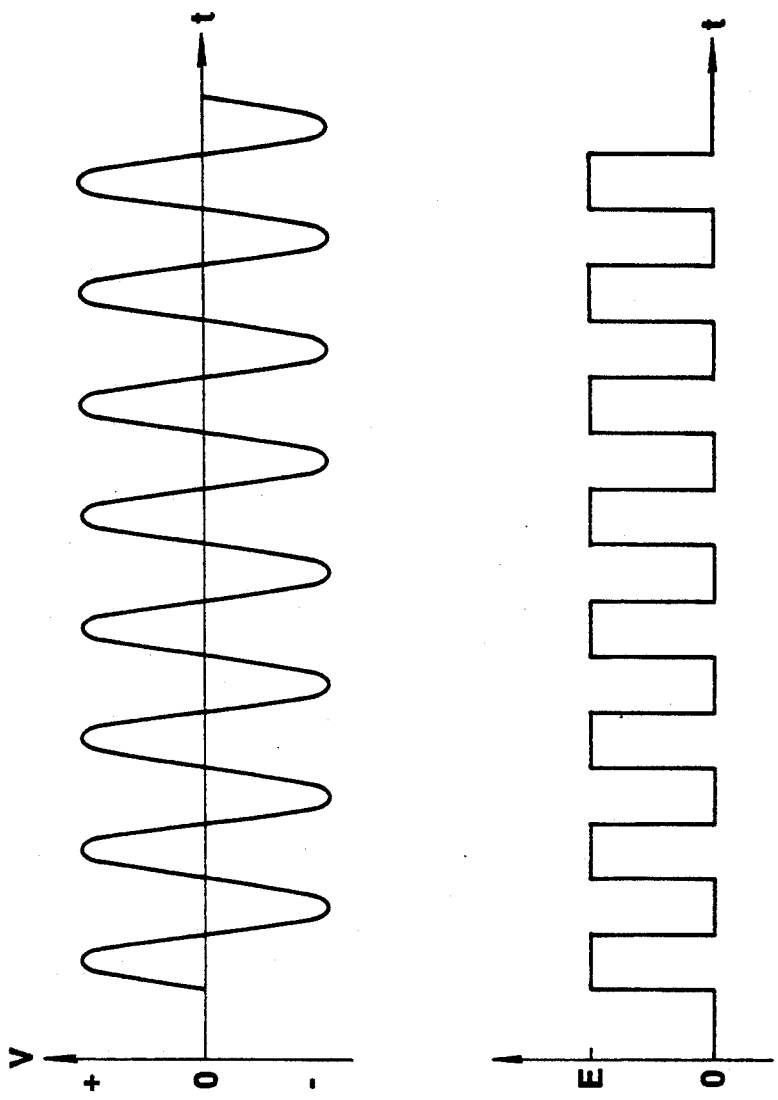

TARGET TRACK POSITION RETRIEVAL DEVICE

BACKGROUND OF THE INVENTION

1. Field of the Invention

This invention relates to a target track position retrieval device for seeking and retrieving a target track on a rotary disc, and is applied to, for example, a disc recording/playback apparatus in which a rotary disc is rotated at constant linear velocity (CLV) to carry out recording or playback of signals.

2. Prior Art

Hitherto, in disc recording/playback apparatus adapted to rotate a disc at a constant linear velocity to carry out recording or playback of signals, for example, as in the display playback apparatus disclosed in the Japanese Patent Publication No. 50035/89, or in the track position retrieval device disclosed in the Japanese Patent Publication No. 50030/89, the number of tracks from a present track up to a target track is calculated as a function of the playback time normally needed to advance from the present track up to the target track, thus to position the head at and recover information from the target track.

Namely, in the disc playback apparatus disclosed in the Japanese Patent Publication No. 50035/89, the target track of radius $[r_2]$ may be calculated, if it is assumed that the disc is provided with concentrical tracks having a track pitch $[p]$, that the playback time needed to advance from a track of a radius $[r_1]$ to the track of radius $[r_2]$ is $[t]$ and that the linear velocity of the disc is represented by $[v]$, as shown in FIG. 1 herein, in accordance with the following equation (1):

$$r_2 = \sqrt{\frac{vp}{\pi} t + r_1^2} \tag{1}$$

Further, the number of tracks $[n]$ from the track of radius $[r_1]$ up to the track of radius $[r_2]$ is determined by equation (2):

$$n = \frac{r_2 - r_1}{p} \tag{2}$$

Retrieval of the target track is carried out as a function of n.

In the target track retrieval device disclosed in the Japanese Patent Publication No. 50030/89, signal playback means plays back signals from information tracks recorded on a rotary disc rotationally driven at constant linear velocity, movement means moves the playback means in a direction traversing information tracks on the rotary disc, counter means responds to the playback means output to count the number of tracks traversed by the playback means, and control means compares predetermined target position information which indicates a target track position to the count value of the counter means to stop movement of the playback means when the predetermined target position information and the count value are in correspondence with each other. If the disc is as shown in FIG. 2 herein, let it be assumed that an innermost circumferential track radius is represented as $[r_0]$, the angular velocity of the disc when the innermost circumferential track is played back is represented by $[N_0]$, the track pitch is represented by $[p]$, the radius of an arbitrary track is represented as $[r]$ and the time duration for playback from radius $r_0$ to radius $r$ is represented by $[t]$. These parameters are related in accordance with equation (3):

$$r = \sqrt{r_0^2 + pN_0 \cdot t(p + 2r_0)} \tag{3}$$

Further, the number of tracks $[M_{2-1}]$ from a present track position of radius $r_1$ to a target track position of radius $r_2$ is determined by the following equation (4):

$$M_{2-1} = \frac{1}{p} \{\sqrt{r_0^2 + pN_0 \cdot t_2(p + 2r_0)} - \sqrt{r_0^2 + pN_0 \cdot t_1(p + 2r_0)}\} \tag{4}$$

Retrieval of the target track is carried out as a function of the number of tracks $M_{2-1}$. Further, at the target track, the angular velocity $[N]$ of the disc rotated for constant linear velocity is determined by the following equation (5):

$$N = \frac{r_0 N_0}{\sqrt{r_0^2 + pN_0 \cdot t_1(p + 2r_0)}} \tag{5}$$

By controlling disc rotational velocity before the target track is reached, high speed retrieval of the target track can be obtained.

Meanwhile, in conventional target track retrieval apparatuses as described above, subduplicate processing and multiplicative processing are required for calculating the number of tracks from a present track position up to a target track position, and for calculating disc velocity at the target track. Accordingly, when a low cost processor is used to implement high speed retrieval of the target track, a large amount of computation time is needed and this is an undesired drawback.

Further, it might be thought that a ROM can be used to store a data table in which the number of tracks up to selected target tracks and the velocity of the disc at those target tracks are calculated in advance. However, in accordance with the standard requirements of, e.g., the so-called compact disc, the linear velocity $[v_o]$ of the disc admits of a tolerance in the range 1.2 to 1.4 [m/s], and the track pitch $[p]$ may be in the range $1.5 \times 10^{-6}$ to $1.7 \times 10^{-6}$ [m]. Because of these ranges, the necessary data table that is required must account for a plurality of linear velocities $[v_o]$ and track pitches $[p]$ and thus must be very large. Consequently, it is difficult to use a data table that will provide high target track acquisition accuracy because of practical limits on the ROM capacity.

OBJECT AND SUMMARY

In view of the problems with the prior art as described above, an object of this invention is to provide a device for accessing a target track on a rotary disc comprising signal playback means for playing back signals from information tracks recorded on the rotary disc which is rotationally driven at a constant linear velocity, movement means for moving the playback means in a direction to traverse information tracks on the disc, counter means responsive to a playback output from the moving playback means to count the information tracks traversed by the playback means and control means for comparing target position information which indicates the position of a target track and the count value of the counter means to stop movement of the playback means when the target position information and the count value are in correspondence with each other, thus permitting a high speed access of a target track by a low cost computational processing device.

To achieve the foregoing, this invention is characterized by a target position information generator means for determining the number of tracks [M] from a present track position of the playback means up to a target track position as a function of the number of tracks [n] that normally would be played back during a normal playback time [$t_n$] from a reference track position to the target position, wherein:

$$t_n = \frac{2\pi}{v_0} \sum_{i=1}^{n} (r_0 + i \cdot p) \quad (6)$$

where [$v_0$] represents the linear velocity, and [$r_0$] represents the radius of a reference track, [p] represents track pitch, [n] represents the number of tracks that must be crossed from the reference track to the target track, and [$t_n$] represents the normal playback time (i. e. elapsed time) for playing back the information from the reference track to the target track; and velocity control means for controlling the rotational velocity of the rotary disc as a function of the time [$\Delta t_n$] required for one rotation of the target track of the disc, wherein:

$$\Delta t_n = \frac{2\pi}{v_0} (r_0 + np) \quad (7)$$

In accordance with this invention, the target position information generator means determines the number of tracks [M] from a present track position up to the target track, and this number [M] is used by the control means for stopping, at the target track, the signal playback means. Further, the velocity control means calculates the time [$\Delta t_n$] needed for one rotation of the disc when the playback means is positioned at the target track and uses this time [$\Delta t_n$] as rotation velocity information to control the rotational velocity of the rotary disc.

BRIEF DESCRIPTION OF THE DRAWING

FIGS. 4A and 4B are signal waveform diagrams showing input and output waveforms of a traverse detection circuit used in the target track retrieval device of FIG. 3.

DETAILED DESCRIPTION OF AN EMBODIMENT

An embodiment of a target track retrieval device according to this invention will now be described in detail with reference to the attached drawings.

Figure 3:
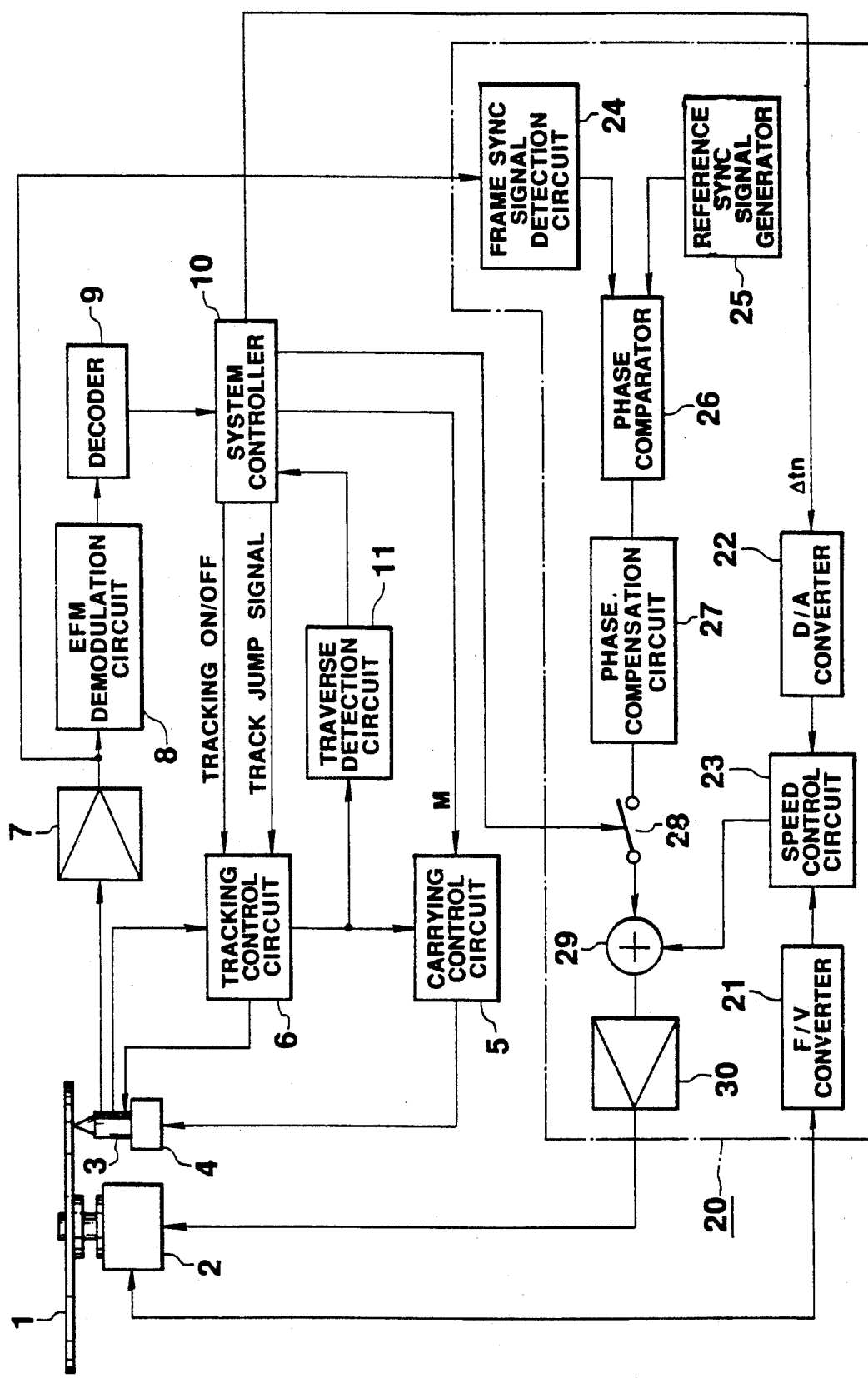
FIG. 3 is a block diagram of one embodiment of a target track retrieval device according to this invention.

FIG. 3 shows the configuration of a target track retrieval device that may be employed in an optical disc player.

In this device, a disc (1) is a compact disc driven at constant linear velocity in which audio data in the form of digitized music signals are recorded on information tracks. This disc (1) is rotatably driven by a spindle motor (2). On the disc (1), control data representing music number information, such as the number of each program or movement, music performance time information, such as the play duration of each program, and/or absolute performance time information from the start position of the information track, such as the total play duration from the beginning of the disc to a respective information track, are multiplexed with the above-mentioned audio data, and are recorded together with a frame SYNC signal in each frame as is conventional.

The spindle motor (2) is controlled by a motor control circuit (20) which will be described later.

The target track retrieval device of this embodiment comprises an optical pickup (3) adapted to project a laser light beam to the disc (1), to detect reflected light therefrom and to convert the reflected beam to an electric signal, thus to play back signals from the information tracks of the disk.

The optical pickup (3) is mounted on a carriage (4) which is driven and controlled by a carrying control circuit (5), so as to be moved in a direction traversing the information tracks, i.e., in a radial direction of the disc (1). The carrying control circuit (5) responds to a control signal from a system controller (10).

In addition, a tracking servo signal produced by a tracking control circuit (6) or a focusing servo signal produced by a focusing control circuit (not shown) is applied to the optical pickup (3).

A playback signal produced by the optical pickup by detecting reflected light from the optical disc (1) is applied to the tracking control circuit (6) or the focusing control circuit (not shown), and is also coupled to an EFM demodulation circuit (8) and a motor control circuit (20) through a playback amplifier (7).

An ON/OFF control signal and a track jump control signal for tracking control are supplied from the system controller (10) to the tracking control circuit (6). During a playback mode, control circuit (6) carries out a tracking control as a function of the playback signal produced by the optical pickup (3) so that the optical pickup precisely scans the information tracks of the optical disc (1) with the light spot of a laser beam. During a retrieval or access mode, tracking control circuit (6) is inhibited by an ON/OFF control signal from the system controller (10) so as to release the tracking control operation until the present track position of the optical pickup (3) (i.e. the track being scanned) reaches a position spaced from the target track position by a predetermined number of tracks, thereby permitting a high speed carrying operation by the carrying control circuit (5) to provide fast track seeking of the optical pickup (3). Then, when the optical pickup (3) reaches this track position, that is, when it is close to the target track position, the tracking control operation is initiated by the ON/OFF control signal from the system controller (10), and controlled track-by-track movement of the light spot on the optical disc (1) up to the target track is carried out in accordance with a track jump signal from the system controller 10). In carrying out the retrieval mode, the tracking control circuit (6) supplies to the carrying control circuit (5) and a traverse detection circuit (11) a traverse signal in the form of the sine wave shown in FIG. 4A. This sine wave traverse signal comprises the playback signal produced by the optical pickup (3) as the light spot rapidly traverses information tracks on the optical disc (1).

The traverse detection circuit (11) performs waveform shaping on the sine wave traverse signal to form traverse detection pulses which are shown as the rectangular wave in FIG. 4B having a number of rising edges corresponding to the number of times the light spot of the optical pickup traverses information tracks. Each traverse detection pulse produced by this traverse detection circuit (11) is applied to the system controller (10).

Pursuant to compact disc standards, the EFM demodulation circuit (8) demodulates EFM (Eight Fourteen Modulation) code to recover from the playback signal produced by the optical pickup (3) and supplied thereto through the playback amplifier (7) a demodulated output which is applied to a decoder (9). This decoder (9) implements typical decode processing, such as descrambling, error correction, etc. on the demodulated output produced by the EFM demodulation circuit (8) to thereby play back, at every frame, the audio data and control data recorded in the information tracks of the optical disc (1). The control data provided from the decoder (9) is coupled to the system controller (10), and the audio data is supplied to an audio data processing system (not shown).

The motor control circuit (20) is comprised of a speed (velocity) control system and a phase control system.

The speed control system of this motor control circuit (20) comprises a frequency/voltage (F/V) converter (21) supplied with a signal whose frequency is proportional to the rotational speed of the spindle motor (2) and is generated by a frequency generator (not shown) affixed to the spindle motor (2). A digital/analog (D/A) converter (22) is supplied with target speed [$\Delta t_n$] data from the system controller (10) representing the proper rotary speed of the target track and a speed control circuit (23) is supplied with the outputs from respective converters (21), (22). The F/V converter (21) converts the frequency signal from the frequency generator, which is proportional to the present rotational speed of the spindle motor (2), to a voltage signal that is supplied to the speed control circuit (23) and the D/A converter (22) converts the target speed [$\Delta t_n$] data from the system controller (10) to a corresponding analog voltage signal indicative of the target speed [$\Delta t_n$] which also is supplied to the speed control circuit (23). The speed control circuit (23) compares the present rotational speed of the spindle motor (2), as indicated by the voltage signal from the F/V converter (21), with the target speed [$\Delta t_n$], as indicated by the voltage signal from the D/A converter (22), to form a speed control signal which drives the actual motor speed to be equal to the target speed and thereby reduce the difference therebetween, or speed error, to zero.

The phase control system of the motor control circuit (20) comprises a frame SYNC signal detection circuit (24) supplied with the playback signal produced by the optical pickup (3) through the playback amplifier (7), a reference SYNC signal generator (25) for generating a reference frame SYNC signal, a phase comparator (26) for carrying out a phase comparison between the frame SYNC signal detected by the frame SYNC signal detection circuit (24) and the reference frame SYNC signal generated by the reference SYNC signal generator (25), and a phase compensation circuit (27) for producing a phase control signal as a function of the difference between the actual and reference frame SYNC signals sensed by the phase comparator (26).

The motor control circuit (20) further comprises a signal adder (29) supplied with a phase control signal from the phase compensation circuit (27) through a switch (28), the switch being subjected to ON/OFF control by the system controller (10). This signal adder (29) adds the phase control signal to the speed control signal produced by the speed control circuit (23) to generate a motor control signal that is coupled to the spindle motor (2) through a power amplifier circuit (30).

In this embodiment, when the playback operational mode is executed, the system controller (10) controls the playback operation, including spindle motor speed control while controlling, at every frame, the track scanning position of the optical pickup (3) on the basis of the control data played back during each frame and recovered by the decoder (9).

On the other hand, when the retrieval or access mode is executed, the system controller (10) carries out a retrieval control operation now described.

When performing the retrieval operation, the system controller (10) receives the present playback time [$t_a$] included in the control data read from the disc at each frame and supplied to the controller by the decoder (9). Then, the system controller (10) acquires the playback time [$t_b$] information of a target track which is derived from control data read from the disc by operation input means (not shown), such as during a conventional initializing mode.

In this case, the playback times [$t_a$], [$t_b$] are provided as absolute music time information, or play times, from a start position of a predetermined information track (or reference) to the present track and to the target track, respectively.

The system controller (10) determines the number of tracks [M] from the present playback track position of the pickup (3) to a target track and it also determines the target track speed, or playback time [$\Delta t_n$] required for one rotation of the target track, as a function of the playback times [$t_a$], [$t_b$]. Whereupon, the system controller produces a carrying control signal comprised of information indicative of the number of tracks [M] and produces target speed information comprised of playback time [$\Delta t_n$] information. Track number information is applied to the carrying control circuit (5) and target speed information is applied to the D/A converter (22) of the motor control circuit (20).

Figure 1:
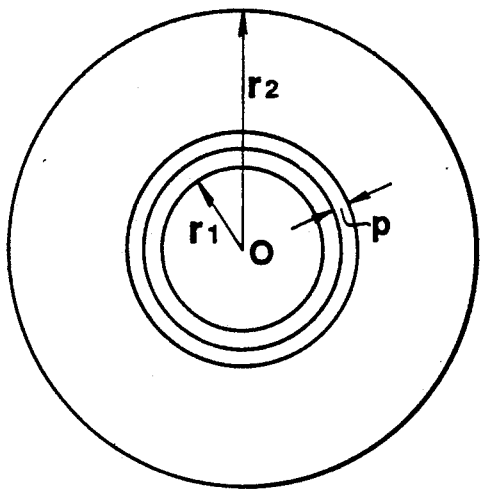
FIG. 1 is a plane view of a disc with circular tracks and has been discussed above in explaining a conventional target track retrieval device.
Figure 2:
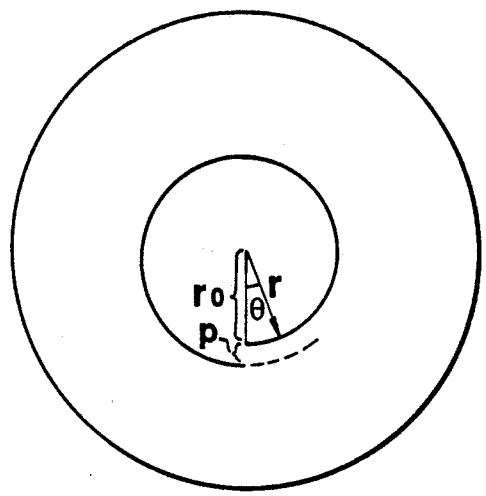
FIG. 2 is a plan view of a disc with a spiral track and it too may be helpful in explaining another conventional target track retrieval device.
Figure 5:
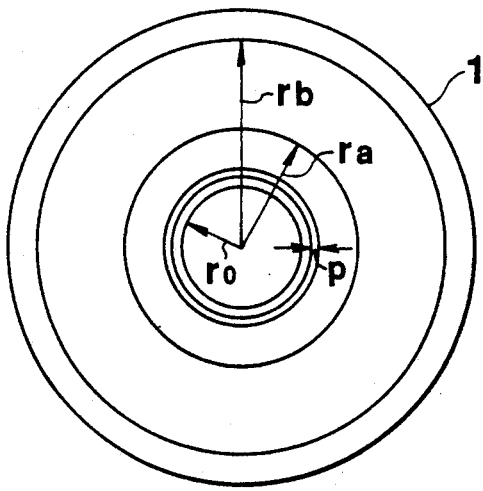
FIG. 5 is a plan view of an approximation model of a disc having concentric circles of information tracks and is helpful in understanding the target track retrieval device shown in FIG. 3.

The optical disc (1) is rotatably driven at a constant linear velocity and the information tracks thereon are concentric, as shown in FIG. 5. If it is assumed that the linear velocity is represented by [$v_o$], the track pitch is represented by [p], and the radius of a reference track, e.g., an innermost circumferential track is represented by [$r_o$], then the playback time [$t_n$] for playing the recorded programs from the beginning of the disc to the target track can be determined by the following equation:

$$t_n = \frac{2\pi}{v_0} \sum_{i=1}^{n} (r_0 + i \cdot p) \tag{8}$$

where [n] is the number of information tracks that must be traversed by the light spot from the optical pickup (3) from the reference track during the playback time [$t_n$], that is, until the target track is reached. The number of tracks between the reference track of radius $r_o$ and a track of radius $r_a$ may be calculated from equation (8) if the playback time is set equal to [$t_a$] and, likewise, the number of tracks between the reference track and a track of radius $r_b$ may be calculated if the playback time is set equal to [$t_b$], as may be seen from FIG. 5. If the light spot presently is at the track of radius $r_a$ and the target track has the radius $r_b$, the number of tracks [M] from the present track position up to the target track position can be determined by the equation:

$$M = |n_b - n_a| \tag{9}$$

Equation 8 indicating the playback time [$t_n$] can be represented by the recurrent formula expressed by either of the following equations which are suitable for computational processing by an electronic computer.

$$t(n+1) = \frac{2\pi}{v_0} \{r_0 + (n+1)p\} + t(n) \tag{10}$$

$$t(0) = 0$$

$$t(n+\alpha) = \frac{\pi}{v_0} \{2\alpha p n + (2r_0 + p)\alpha + p\alpha^2\} + t(n) \tag{11}$$

$$t(0) = 0 \quad (\alpha \text{ is an integer})$$

Equation 8 indicating the playback time [$t_n$] may be transformed as follows:

$$t_n = 2\pi n \left( 2r_0 + p \frac{1+n}{2} \right) \tag{12}$$

When equation 12 is used to represent the playback time [$t_n$], the number of tracks [n] that the light spot from the optical pickup (3) traverses from the reference track to the target track during this playback time [$t_n$] may be calculated.

Further, the time required for one rotation of the disc [$\Delta t_n$] (i.e. the disc speed) at the target track corresponding to the playback time [$t_n$] represented by equation 8 can be calculated from the many number of times a light spot of the optical pickup (3) would traverse information tracks starting from the reference track during the entire playback time [$t_n$] in accordance with the following:

$$\Delta t_n = \frac{2\pi}{v_0} (r_0 + n \cdot p) \tag{13}$$

$$t_{i-n} = \sum_{i=1}^{n} \Delta t_i = \frac{2\pi}{v_0} \sum_{i=1}^{n} (r_0 + i \cdot p) \tag{14}$$

Equation 14 may be rewritten as a recurrent formula suitable for computational processing by a computer, resulting in the following equations:

$$t(n+1) = An + B + t(n) \tag{15}$$
$$t(0) = 0$$

$$t(n+\alpha) = Cn + D + t(n) \tag{16}$$
$$t(0) = 0 \quad (\alpha \text{ is an integer})$$

In the equations 15 and 16, A, B, C and D are constants which may be determined or calculated in advance for a particular disc, as during a conventional initializing run. Since [p] and [$v_o$] have a small variation, as mentioned above, even if these constants are stored as a table, only a relatively small portion of the memory capacity of a ROM is needed.

The time [$\Delta t_n$] information, that is, the time required for one rotation of the disc at the target track, which is calculated by using equation 13, is proportional to the number of rotations [m] of the disc per unit time, which indicates the rotational speed of the disc at the target track.

As stated above, the system controller (10) determines the number of tracks [M] from a present track position to a target track by using equation 9 on the basis of the number of tracks [n] that must be traversed during the playback time [$t_n$], and this playback time [$t_n$] is calculated by using equation 8 to indicate the playback time from the reference track. The system controller also calculates the time [$\Delta t_n$] required for one rotation of the target track by using equation 13.

When the tracking control operation by the tracking control circuit (6) is released, the system controller (10) supplies the calculated track number [M] information to the carrying control circuit (5), and also supplies the calculated time [$\Delta t_n$] information to the D/A converter (22) of the motor control circuit (20) as disc speed information for the target track.

The carrying control circuit (5) moves the optical pickup (3) mounted on the carriage (4) toward the target track at a high speed in accordance with the track number [M] information received from the system controller (10).

At this time, the speed control system of the motor control circuit (20) controls the rotational speed of the optical disc (1) by the spindle motor (2) so that the disc speed is made equal to the rotational speed for the target track in advance of arriving at that track using, as target speed information, the time [$\Delta t_n$] information supplied from the system controller (10) to the D/A converter (22).

The system controller (10) subtracts from the track number [M] information each rising edge of a traverse detection pulse produced by the traverse detection circuit (11) and supplies the difference to the carrying control circuit (5) to control the high speed carrying operation of the optical pickup (3). When the resultant track number M information becomes equal to a predetermined number of tracks [$M_o$], the system controller (10) initiates the tracking control operation by the tracking control circuit (6), and closes the switch (28) of the motor control circuit (20) to effect phase control of the spindle motor. The system controller (10) is supplied with the control data of the present track read therefrom by the light spot and provided by the decoder (9) to produce a track jump signal which is applied to the tracking control circuit (6) to carry out a track jump control operation for moving the light spot on the optical disc (1) to the target track in accordance with normal playback tracking control.

When the present playback time information [$t_a$] included in the control data on the present track and recovered by the decoder (9) corresponds to the playback time information [$t_b$] included in the control data on the target track (and which was known in advance from the initialization of the above described operating means), the retrieval operation mode is completed.

Although in the above-described embodiment, a technique is employed to calculate the number of tracks [M] up to a target track, or a time [$\Delta t_n$] required for one rotation of the disc in a target track, this invention is not limited only to this embodiment.

Figure 6:
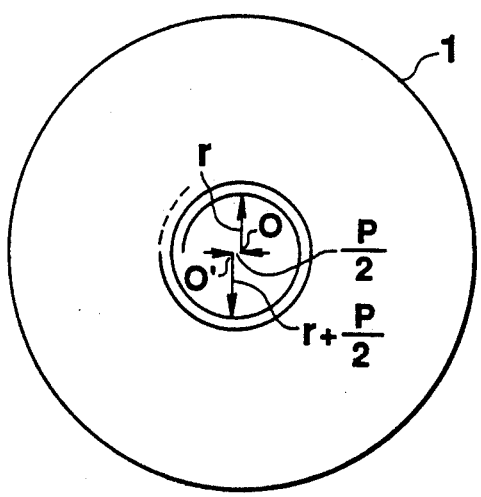
FIG. 6 is a plan view of an approximation model of a disc having helical information tracks and will be discussed in conjunction with the operation of the target track retrieval device shown in FIG. 3.

For example, as shown in FIG. 6, a model is illustrated, based on the approximation of the combination of a semicircle having a radius [r] with the point [o] as a center and a semicircle having the radius [r+p/2] with the point [o'] (spaced from the point [o] by the distance [p/2]) resulting in helical or spiral information tracks having a track pitch [p]. The playback time [$t_n$] from a reference track having the radius [$r_o$] can be expressed by the following equation:

$$t_n = \frac{2\pi}{v_0} \sum_{i=1}^{n} (r_0 + i \cdot p) \quad (17)$$

where [n] is the number of information tracks traversed by the light spot of the optical pickup (3) during the playback time [$t_n$] until the target track is reached. Thus, equation 17 may be used to calculate the number of tracks [M] separating a present track position from the target track. Further, the time [$\Delta t_n$] required for one rotation of the disc when the target track is reached is expressed as follows:

$$\Delta t_n = \frac{2\pi}{v_0} \{(r_0 + np) + \pi p/2\} \quad (18)$$
$$= \frac{2\pi}{v_0} (r'_0 + pn)$$

$$t_{0-n} = \sum_{i=0}^{n} \Delta t_i \quad (19)$$
$$= \frac{2\pi}{v_0} \sum_{i=1}^{n} \{(r_0 + np) + \pi p/2\}$$
$$= \frac{2\pi}{v_0} \sum_{i=1}^{n} (r'_0 + np)$$

$$(r'_0 = r_0 + \pi p/2)$$

Thus, the time [$\Delta t_n$] can be calculated efficiently by a computer using a recurrent formula in the same form as that discussed above for the above-described concentric circle embodiment of FIG. 5.

As described above, the target track retrieval device according to this invention is adapted to determine the number of tracks [M] from a present track position to a target track on the basis of the number of tracks [n] that are played during a normal playback time [$t_n$] from a reference track to the target track, calculated by using the following equation:

$$t_n = \frac{2\pi}{v_0} \sum_{i=1}^{n} (r_0 + i \cdot p)$$

where [$v_o$] represents constant linear velocity of the disc, [p] represents track pitch and [$r_o$] represents the radius of the reference track of the rotary disc; and [n] represents the number of times the playback means traverses the information tracks. In addition, the time [$\Delta t_n$] required for one rotation of the disc at the target track is calculated from the number of tracks [n] that must be traversed from the reference track to the target track in accordance with the following equation:

$$\Delta t_n = \frac{2\pi}{v_0} (r_0 + n \cdot p)$$

As a result, carrying control of the playback means is effected by using the track number [M] as the target track information, and rotational speed of the rotary disc is controlled by using the time [$\Delta t_n$] information as disc rotational speed information. Hence, high speed retrieval of the target track may be carried out by using a low cost computational processing device.

What is claimed is:

1. In a target track retrieval device having rotary drive means for rotating a record disc on which signals have been recorded in information tracks while the recorded disc was rotatably driven at a constant linear velocity, signal playback means for playing back said signals recorded int eh information tracks and providing corresponding reproduced output signals, movement means for moving said playback means in a direction traversing said information tracks and being selectively operable at a normal playback speed and at a high target track retrieval speed, counter means connected with said playback means and responsive to said output signals therefrom for counting a number of information tracks traversed by the playback means, and control means for comparing target position information indicating a target track and a count value of said counter means and providing a control signal to said movement means to stop movement of said playback means when said target position information and said count value are in correspondence with each other, the combination of:

target position information generator means for determining a number of tracks M from a present track position of said playback means to a target track as a function of a number of tracks n to be traversed by said playback means during a playback time $t_n$ from a reference track to said target track, wherein $$t_n = \frac{2\pi}{v_0} \sum_{i=1}^{n} (r_0 + i \cdot p)$$

and $v_o$ is the linear velocity of said disc, p it a track pitch and $r_o$ is a radius of the reference track, and velocity control means connected with said rotary drive means for controlling the rotational velocity of said disc when signals from the target track are played back so that $$\Delta t_n = \frac{2\pi}{v_0} (r_0 + np)$$

and $\Delta t_n$ represents the time for the target track to make one rotation.

2. The device of claim 1, wherein the information tracks are spiral information tracks having track pitch p, and wherein the time for the target track to make one rotation is represented as:

$$\Delta t_n = \frac{2\pi}{v_0} (r'_0 + pn)$$

wherein $r'_o = r_o + \pi p/2$.

3. The device of claim 1, wherein said velocity control means includes frame SYNC signal detection means receiving said output signals from said signal playback means for detecting frame SYNC signals reproduced by said signal playback means from said information tracks, reference from SYNC signal generator means for generating reference frame SYNC signals, phase comparison means connected with said frame SYNC signal detection means and said reference frame SYNC generator means for phase comparing from SYNC signals detected from said information tracks and said reference frame SYNC signals, and phase compensation means responsive to said phase comparison means for supplying a phase control signal to said velocity control means when said signal playback means moves to a track that is a predetermined number of tracks from said target track.

4. The device of claim 3, further comprising switch means interposed between said phase compensation means and said velocity control means and being controlled by said control means for supplying said phase control signal to said velocity control means during playback of signals from said information tracks with said signal playback means being moved at said normal playback speed and to interrupt said phase control signal when said signal playback means is moved at said high target track retrieval speed.

5. Apparatus for determining, in respect to a record disc which is rotatably driven to exhibit a substantially constant linear velocity $V_o$, a number n of information tracks recorded on the disc from a reference track of radius $r_o$ to a target track, said information tracks exhibiting a pitch p and having useful information and control data recorded therein with the control data in at least some of said information tracks representing playback durations from said reference track to the respective information tracks, said apparatus comprising:

playback means scanning the rotatably driven disc for playing back said useful information and control data recorded in said information tracks of said disc; and system controller means connected with said playback means for receiving therefrom said control data representing playback durations and determining therefrom a playback time $t_n$ for playing back said useful information and control data from said reference track to said target track from the following:

$$t_n = \frac{2\pi}{v_0} \sum_{i=1}^{n} (r_0 + i \cdot p).$$

6. Apparatus for accessing and playing back information from a target track among information tracks recorded on a disc rotatably driven at substantially constant linear velocity $v_o$, and wherein said information tracks are of pitch p and have useful information and control data therein and further wherein the control data in at least some of said information tracks represents a playback duration from a reference track of radius $r_o$ to the respective information track, said apparatus comprising:

playback means for scanning said information tracks on the rotatably driven disc to play back useful information and control data therefrom;

playback drive means for driving said playback means to traverse said information tracks and being selectively operative at a playback speed or at a relatively high access speed;

decoder means coupled to said playback means for decoding the control data played back from said information tracks;

transverse detecting means connected with said playback drive means for detecting traversals of said information tracks by said playback means;

tracking control means connected with said playback drive means and being selectively operative during a playback operation to control the scanning of an information track by said playback means;

velocity control means for controlling the rotary speed of said disc such that each information track is scanned by said playback means at substantially said constant linear velocity; and system controller means connected with said playback means, said playback drive means, said traverse detecting means, said tracking control means and said velocity control means and being supplied with playback duration information $t_a$ recovered from said control data in an information track of radius $r_a$ presently scanned by said playback means and with playback duration information $t_b$ recovered from said disc and representing the playback duration from said reference track of radius $r_0$ to a target track to determine the number M of information tracks from said presently scanned track to said target track, wherein $M = |n_b - n_a|$, where $n_b$ is a number of tracks from said reference track to said target track, $n_a$ is a number of tracks from said reference track to said presently scanned track, $$t_a = \frac{2\pi}{v_0} \sum_{i=1}^{n_a} (r_0 + i \cdot p),$$

and $$t_b = \frac{2\pi}{v_0} \sum_{i=1}^{n_b} (r_0 + i \cdot p),$$

said system controller means being programmed for operating said playback drive means at said relatively high access speed to drive said playback means toward said target track until the number of detected traversals of the information corresponds tracks to M, whereupon, said system controller means determines a time $\Delta t_b$ for the target track to make one rotation from the following $$\Delta t_b = \frac{2\pi}{v_0} (r_0 + n_b p),$$

and then said system controller means operates said velocity control means to rotate said disc at a speed determined by said time $\Delta t_b$ so as to permit the playback of useful information from said target track.

7. The apparatus of claim 6 wherein said system controller means includes counter means responsive to said traverse detecting means for counting traversals of said information tracks and means for sensing when the count of said counter means differs from said number M by a predetermined amount whereupon said tracking control means is operated until said target track is scanned.

8. The apparatus of claim 6 wherein said system controller means includes means for decrementing said number M in response to each traversal of said information tracks until said number is reduced to a predetermined value $M_o$, whereupon said tracking control means is operated until said target track is scanned.

9. The apparatus of claim 6 wherein said system controller means initiates operation of said velocity control means to rotate said disc at a speed determined by said time $\Delta t_b$ while said playback means is driven toward said target track at said access speed.

* * * * *